United States Patent
Chen et al.

(10) Patent No.: US 9,952,712 B2
(45) Date of Patent: Apr. 24, 2018

(54) METHOD AND SYSTEM FOR COMMUNICATION BETWEEN TOUCH CONTROL DEVICE AND EXTERNAL DEVICE

(71) Applicant: SHENZHEN HUIDING TECHNOLOGY CO., LTD., Shenzhen (CN)

(72) Inventors: Xiaoxiang Chen, Shenzhen (CN); Jun Fang, Shenzhen (CN)

(73) Assignee: SHENZHEN GOODIX TECHNOLOGY CO, LTD., Shenzhen, Guangdong (CN)

( * ) Notice: Subject to any disclaimer, the term of this patent is extended or adjusted under 35 U.S.C. 154(b) by 139 days.

(21) Appl. No.: 15/085,233

(22) Filed: Mar. 30, 2016

(65) Prior Publication Data
US 2016/0209983 A1    Jul. 21, 2016

Related U.S. Application Data

(63) Continuation of application No. PCT/CN2014/081765, filed on Jul. 7, 2014.

(30) Foreign Application Priority Data

Sep. 30, 2013  (CN) .......................... 2013 1 0465234

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0418* (2013.01)

(58) Field of Classification Search
CPC ....... G06F 3/0416; G06F 3/0418; G06F 3/044
(Continued)

(56) References Cited

U.S. PATENT DOCUMENTS 5,528,002 A    6/1996 Kabushiki
9,619,022 B2 *  4/2017 Li .......................... G06F 3/013
(Continued)

FOREIGN PATENT DOCUMENTS

CN    102760015 A    10/2012
CN    102866792 A     1/2013
(Continued)

OTHER PUBLICATIONS

State Intellectual Property Office of the P.R. China (ISR/CN), "International Search Report for PCT/CN2014/081765", China, dated Oct. 10, 2014.
(Continued)

*Primary Examiner* — Tony Davis
(74) *Attorney, Agent, or Firm* — Tim Tingkang Xia, Esq.; Locke Lord LLP

(57) ABSTRACT

The present invention provides a method for communication between a touch control device and an external device, comprising the following steps: when an external device communicates with a touch screen, sending, by the external device, 1-bit data to the touch screen within each sending period, wherein the 1-bit data sent within each sending period is a combination of a valid signal and an invalid signal, or an invalid signal; scanning, by the touch screen, the bit data based on a predetermined scanning period to obtain N frames of scanned data, wherein the predetermined scanning period is 1/N of the sending period; obtaining a strength of an LCD interference signal according to one frame of data having a minimum signal strength among the N frames of scanned data; and reducing noise for the N frames of scanned data according to the strength of the LCD interference signal.

10 Claims, 8 Drawing Sheets

(58) Field of Classification Search
USPC .................................................. 345/170–176
See application file for complete search history.

(56) References Cited

U.S. PATENT DOCUMENTS

| | | |
|---|---|---|
| 2011/0057890 A1 | 3/2011 | Goo et al. |
| 2011/0096011 A1 | 4/2011 | Suzuki |
| 2011/0115729 A1 | 5/2011 | Kremin et al. |
| 2011/0304583 A1 | 12/2011 | Kruglick |
| 2012/0105353 A1 | 5/2012 | Brosnan |
| 2013/0221993 A1 | 8/2013 | Ksondzyk et al. |
| 2016/0116978 A1* | 4/2016 | Li .......................... G06F 3/013 345/156 |
| 2016/0328767 A1* | 11/2016 | Bonner ............... G06Q 30/0625 |
| 2017/0115749 A1* | 4/2017 | Li .......................... G06F 3/0346 |
| 2017/0116223 A1* | 4/2017 | Li ..................... G06F 17/30241 |

FOREIGN PATENT DOCUMENTS

| | | |
|---|---|---|
| CN | 102902383 A | 1/2013 |
| JP | H07200147 A | 8/1995 |
| JP | 2011180401 A | 9/2011 |
| KR | 20110026765 A | 3/2011 |

OTHER PUBLICATIONS

Korean Intellectual Property Office, "First Korean Office Action for Application No. 10-2016-7008716", Korea, dated Jan. 18, 2017.
State Intellectual Property Office of the P. R. C., "First Chinese Office Action for Application No. 201310465234.9", China, dated Jan. 17, 2017.
European Patent Office, "Extended European Search Report for PCT/CN2014081765," dated May 16, 2017.

* cited by examiner

METHOD AND SYSTEM FOR COMMUNICATION BETWEEN TOUCH CONTROL DEVICE AND EXTERNAL DEVICE

CROSS-REFERENCE TO RELATED APPLICATIONS

This application is a continuation of International Patent Application No. PCT/CN2014/081765, with an international filing date of Jul. 7, 2014, designating the United States, which is based on Chinese Patent Application No. 201310465234.9, filed Sep. 30, 2013. The contents of these specifications are incorporated herein by reference in their entireties.

BACKGROUND OF THE INVENTION

Field of the Invention

The present invention relates to the technical field of communications, and in particular, relates to a method and system for communication between a touch control device and an external device.

Description of the Related Art

With the development of touch control technologies and mobile terminal technologies, more and more touch control devices achieve man-machine interactions by means of touch control, for example, mobile terminals. At present, touch screens employed by the mobile terminals mainly include capacitive touch screens and resistive touch screens, wherein the capacitive touch screens are popular among more and more people with better definition, light transmittance and touch feeling.

Nowadays, the electronic products, for example, smart phones typically employ LCDs as man-machine interaction interfaces. Use of the capacitive touch screens gives greater convenience and humanization to such interactions. Commonly used capacitive touch screens generally include a driving layer and an induction layer, a glass or thin film is sandwiched therebetween as a barrier, and wirings of these two layers are perpendicular to each other. A prevailing approach is fabricating the driving layer and the induction layer of the capacitive touch screen inside the LCD, that is, between a TFT array substrate and a color filter. One implementation manner is using the signal of the LCD as a driving signal output end of the touch screen, and adding an induction layer as a signal receiving send of the touch screen. Since only one induction layer needs to be added, relative to the two-layer capacitive touch screen, the production of the touch screen may be simplified, and the efficiency may be improved and the cost may be reduced.

When a mobile terminal communicates with other devices (for example, touch pens or other mobile terminals), the driving signal of the LCD may cause interference to detection of the capacitive touch screen, and thus cause communication data of the touch screen to be subjected to errors and cause an increase of bit error rates and retransmission probability, which thus affects the quality of the communication between the touch screen with other mobile terminals.

SUMMARY OF THE INVENTION

The present invention is intended to solve at least one of the above technical problems.

To this end, one objective of the present invention is to provide a method for communication between a touch control device and an external device. The method is capable of effectively reducing the probability of communication errors and improving the quality of the communication between a touch screen and an external device.

Another objective of the present invention is to provide a system for communication between a touch control device and an external device.

To achieve the above objectives, a first aspect of embodiments of the present invention provides a method for communication between a touch control device and an external device, comprising the following steps: when an external device communicates with a touch screen, sending, by the external device, 1-bit data to the touch screen within each sending period, wherein the 1-bit data sent within each sending period is a combination of a valid signal and an invalid signal, or an invalid signal; scanning, by the touch screen, the bit data based on a predetermined scanning period to obtain N frames of scanned data, wherein the predetermined scanning period is 1/N of the sending period; obtaining a strength of an LCD interference signal according to one frame of data having a minimum signal strength among the N frames of scanned data; and reducing noise for the N frames of scanned data according to the strength of the LCD interference signal.

With the method for communication between a touch control device and an external device according to embodiments of the present invention, by changing a coding manner of communication between other devices and the touch screen and reducing noise for the signal received by the touch screen, the interference caused by the LCD to the signal may be reduced, the probability of communication errors of the touch screen may be lowered, and the quality of the communication between the touch screen and the external device is improved.

In addition, the method for communication between a touch control system and an external device according to the above embodiments of the present invention may further comprise the following additional technical features.

In some examples, the one frame of scanned data having the minimum signal strength is subtracted from the remaining frames of scanned data in the N frames of scanned data; the difference is compared with a predetermined value; and a bit data value corresponding to the bit data is obtained according to the comparison result, wherein if the difference is greater than the predetermined value, it is judged that a value of the corresponding 1-bit data is 1, and otherwise, it is judged that the a value of the corresponding 1-bit data is 0.

In some examples, if the 1-bit data sent within each sending period comprises a valid signal, a predetermined valid signal sending time is equal to the scanning period.

In some examples, the obtaining a strength of an LCD interference signal according to one frame of data having a minimum signal strength among the N frames of scanned data further comprises: acquiring at least one frame of scanned data which is a valid signal from the N frames of scanned data; and using a value of a data frame of the at least one frame of scanned data as the strength of the LCD interference signal.

In some examples, the touch control device is a mobile terminal, and the external device is a touch pen or a mobile terminal.

A second aspect of embodiments of the present invention provides a system for communication between a touch control device and an external device, comprising a touch control device and an external device; wherein when the external device establishes communication with a touch screen of the touch control device, the external device is configured to send 1-bit data to the touch screen within each sending period, wherein the 1-bit data sent within each sending period is a combination of a valid signal and an invalid signal, or an invalid signal; and the touch control device is configured to scan the bit data based on a predetermined scanning period to obtain N frames of scanned data, wherein the predetermined scanning period is 1/N of the sending period; obtain a strength of an LCD interference signal according to one frame of data having a minimum signal strength among the N frames of scanned data; and reduce noise for the N frames of scanned data according to the strength of the LCD interference signal.

With the system for communication between a touch control device and an external device according to embodiments of the present invention, by changing a coding manner of communication between other devices and the touch screen and reducing noise for the signal received by the touch screen, the interference caused by the LCD to the signal may be reduced, the probability of communication errors of the touch screen may be lowered, and the quality of the communication between the touch screen and the external device is improved.

In addition, the system for communication between a touch control system and an external device according to the above embodiments of the present invention may further comprise the following additional technical features.

In some examples, the one frame of scanned data having the minimum signal strength is subtracted from the remaining frames of scanned data in the N frames of scanned data; the difference is compared with a predetermined value; and a bit data value corresponding to the bit data is obtained according to the comparison result, wherein if the difference is greater than the predetermined value, it is judged that a value of the corresponding 1-bit data is 1, and otherwise, it is judged that the a value of the corresponding 1-bit data is 0.

In some examples, if the 1-bit data sent within each sending period comprises a valid signal, a predetermined valid signal sending time is equal to the scanning period.

In some examples, the touch control device is configured to: acquire at least one frame of scanned data which is an invalid signal from the N frames of scanned data; and use a value of a data frame of the at least one frame of scanned data as the strength of the LCD interference signal.

In some examples, the touch control device is a mobile terminal, and the external device is a touch pen or a mobile terminal.

The additional aspects and advantages of the present invention are partially illustrated in the following description, and the other portions would become more obvious from the following description or would be known from the practice of the present invention.

BRIEF DESCRIPTION OF THE DRAWINGS

The above described and/or additional aspects and advantages of the present invention would be obvious and simple to understand with reference to the description of the embodiments in combination with the accompanying drawings.

DETAILED DESCRIPTION OF THE EMBODIMENTS

Figure 1:
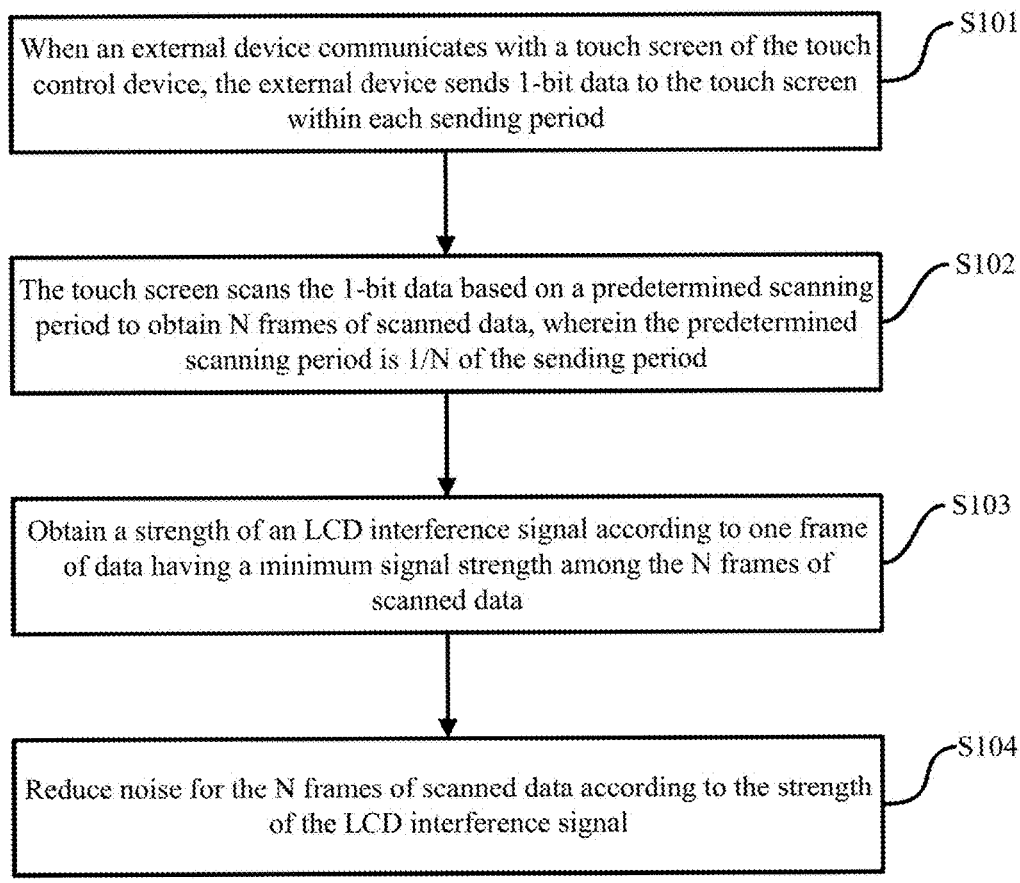
FIG. 1 is a flowchart illustrating a method for communication between a touch control device and an external device according to an embodiment of the present invention.

The embodiments of the present invention are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary, and are intended to illustrate and interpret the present invention, which shall not be construed as causing limitations to the present invention.

In the description of the present invention, it should be understood that the terms "central", "transversal", "longitudinal", "upper", "lower", "front", "rear", "left", "right", "vertical", "horizontal", "top", "bottom", "inner", "outer" and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present invention. In addition, the terms "first" and "second" are merely for the illustration purpose, and shall not be construed as indicating or implying a relative importance.

In the description of the present invention, it should be noted that unless otherwise specified and defined, the terms "mounted", "coupled" and "connected" and derivative forms of these words shall be understood in a broad sense, which, for example, may be understood as fixed connection, detachable connection or integral connection; may be mechanically connected or electrically connected; or may be directly connected, indirectly connected via an intermediate medium or communication between the interiors of two elements. Persons of ordinary skill in the art may understand the specific meanings of the above terms in the present invention according to the actual circumstances and contexts.

Method and system for communication between a touch control device and an external device according to embodiments of the present invention are hereinafter described with reference to the accompanying drawings.

FIG. 1 is a flowchart illustrating a method for communication between a touch control device and an external device according to an embodiment of the present invention. As illustrated in FIG. 1, the method for communication between a touch control device and an external device according to the embodiment of the present invention comprises the following steps:

Step S101: when an external device communicates with a touch screen, the external device sends 1-bit data to the touch screen within each sending period, wherein the 1-bit data sent within each sending period is a combination of a valid signal and an invalid signal, or an invalid signal.

If the 1-bit data sent within each sending period comprises a valid signal, a predetermined valid signal sending time is equal to the scanning period.

Step S102: The touch screen scans the 1-bit data based on a predetermined scanning period to obtain N frames of scanned data, wherein the predetermined scanning period is 1/N of the sending period.

Step S103: A strength of an LCD interference signal is obtained according to one frame of data having a minimum signal strength among the N frames of scanned data.

Specifically, this step comprises the following steps:

1. acquiring at least one frame of scanned data which is an invalid signal from the N frames of scanned data; and 3. using a value of a data frame of the at least one frame of scanned data as the strength of the LCD interference signal.

Step S104: Noise for the N frames of scanned data is reduced according to the strength of the LCD interference signal.

In an embodiment of the present invention, after the reducing noise for the N frames of scanned data, the method further comprises:

1. subtracting the one frame of scanned data having the minimum signal strength from the remaining frames of scanned data in the N frames of scanned data;

2. comparing the difference with a predetermined value; and 3. obtaining a bit data value corresponding to the bit data according to the comparison result, wherein if the difference is greater than the predetermined value, judging that a value of the corresponding 1-bit data is 1, and otherwise, judging that the value of the corresponding 1-bit data is 0. The predetermined value is empirically determined. In the above examples, the touch control device is, but not limited to, a mobile terminal, and the external device is, but not limited to, a touch pen or a mobile terminal. The mobile terminal may be, for example, a smart phone.

For a better understanding of the method for communication between a touch control device and an external device according to embodiments of the present invention, description is given hereinafter with reference to specific examples.

Firstly, the working principles of the method for communication between a touch control device and an external device according to embodiments of the present invention are as follows: since an interference strength (hereinafter referred to as LCD interference strength) of a driving signal of an LCD is related to the image currently displayed on the touch screen, and switching of the images may contiguous, from the perspective of the time sequence, changes of the LCD interference strength are slow and contiguous. A higher frequency of the communication signal signifies a shorter time for sending a data bit. Within a short time range, the interference strength of the LCD may be maintained constant. Therefore, within a shorter time period, it may be ensured that a data frame having no valid signal is present. A value of this data frame is the strength of the LCD interference. This data frame is used as a reference. With respect to other data frames, the LCD interference values are filtered by subtracting the reference.

Embodiment 1

A touch screen needs to perform data communication with an active pen (that is, a touch pen), and a pressure signal detected by the touch pen is transmitted to a touch screen controller and is reported by a touch screen control chip to a control board. During the transmission, due to the interference caused by the LCD, the transmitted data may be subjected to an error. By means of noise reduction, the error probability may be lowered, and the anti-interference capability of the system is enhanced.

Figure 2:
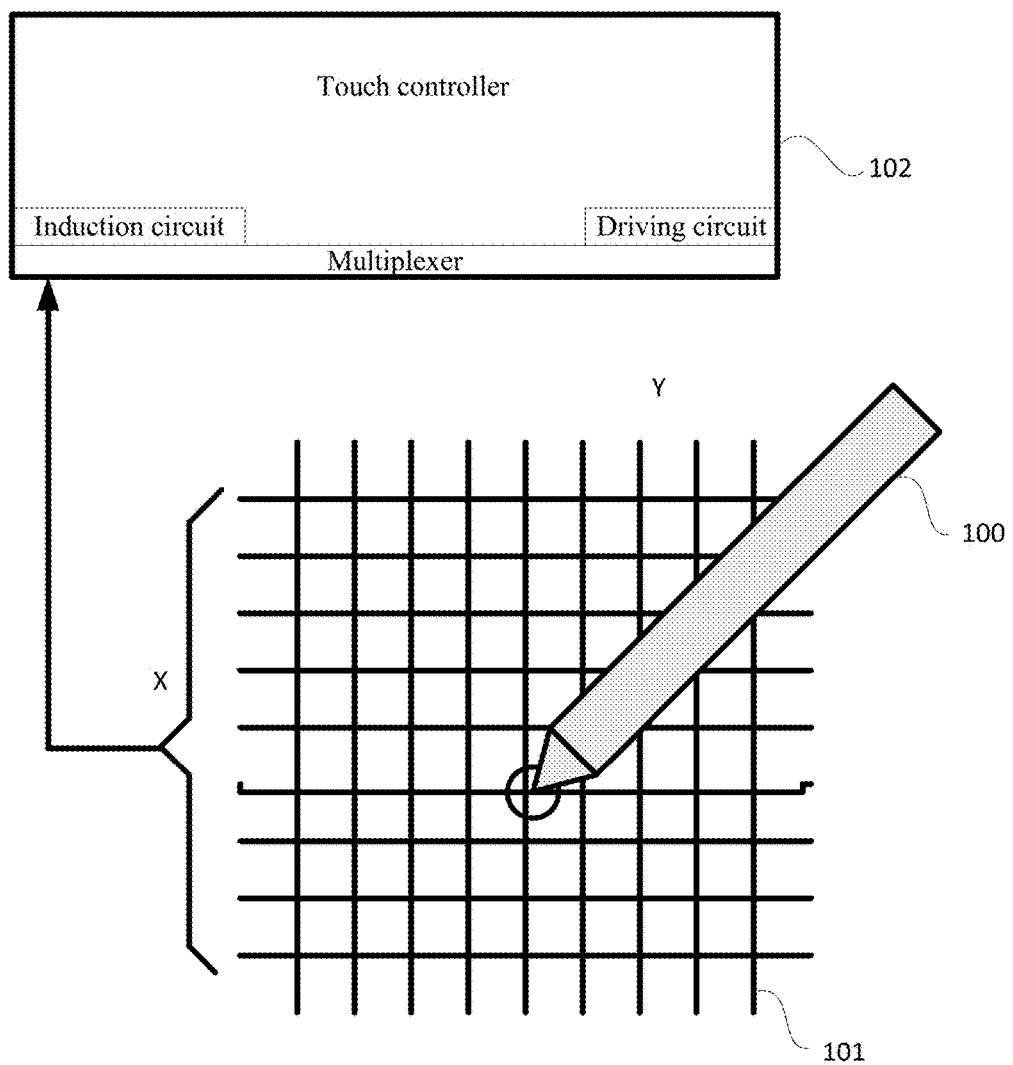
FIG. 2 is a schematic diagram illustrating a touch screen and a touch pen in the method for communication between a touch control device and an external device according to an embodiment of the present invention.
Figure 3:
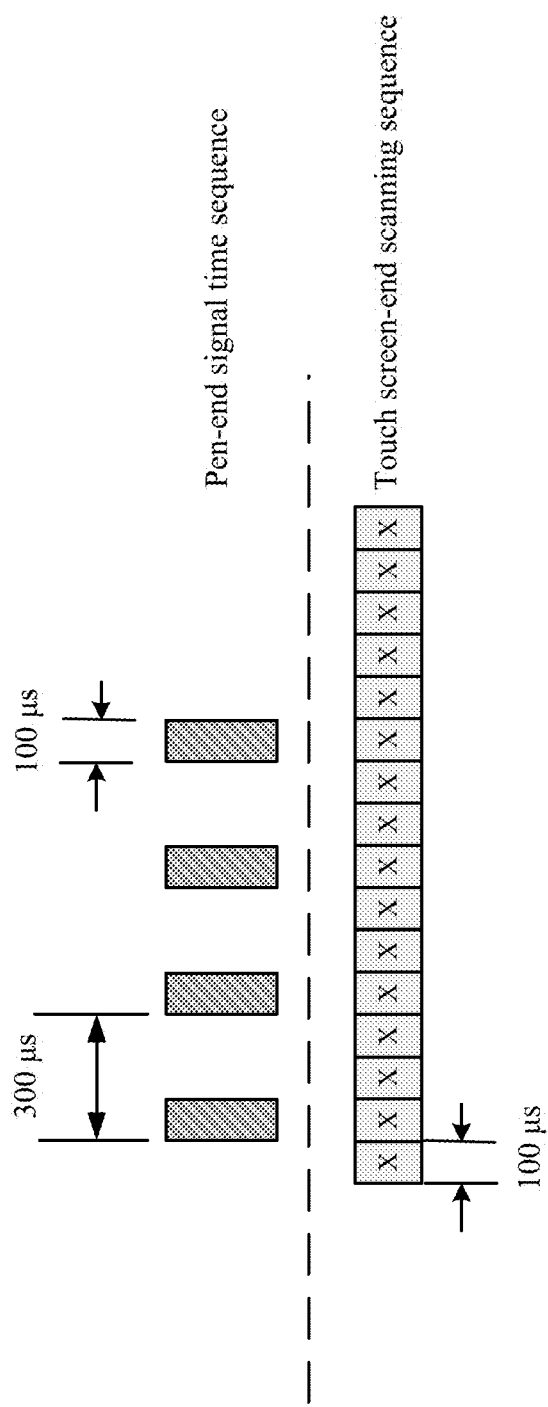
FIG. 3 is a schematic diagram illustrating a communication time sequence of a touch screen and a touch pen in the method for communication between a touch control device and an external device according to an embodiment of the present invention.

As illustrated in FIG. 2, upon detecting a penpoint pressure, the active pen needs to code the pressure, and a signal sender of the penpoint sends a signal according to the code. Each bit of data is sent using 300 μs. If a bit of data is 1, valid signals are sent within the first 100 μs and no valid signal is sent within the remaining 200 μs. If a bit of data is 0, no valid signal is sent within the whole 300 μs. FIG. 3 illustrates a sending time sequence at the pen end.

Figure 4:
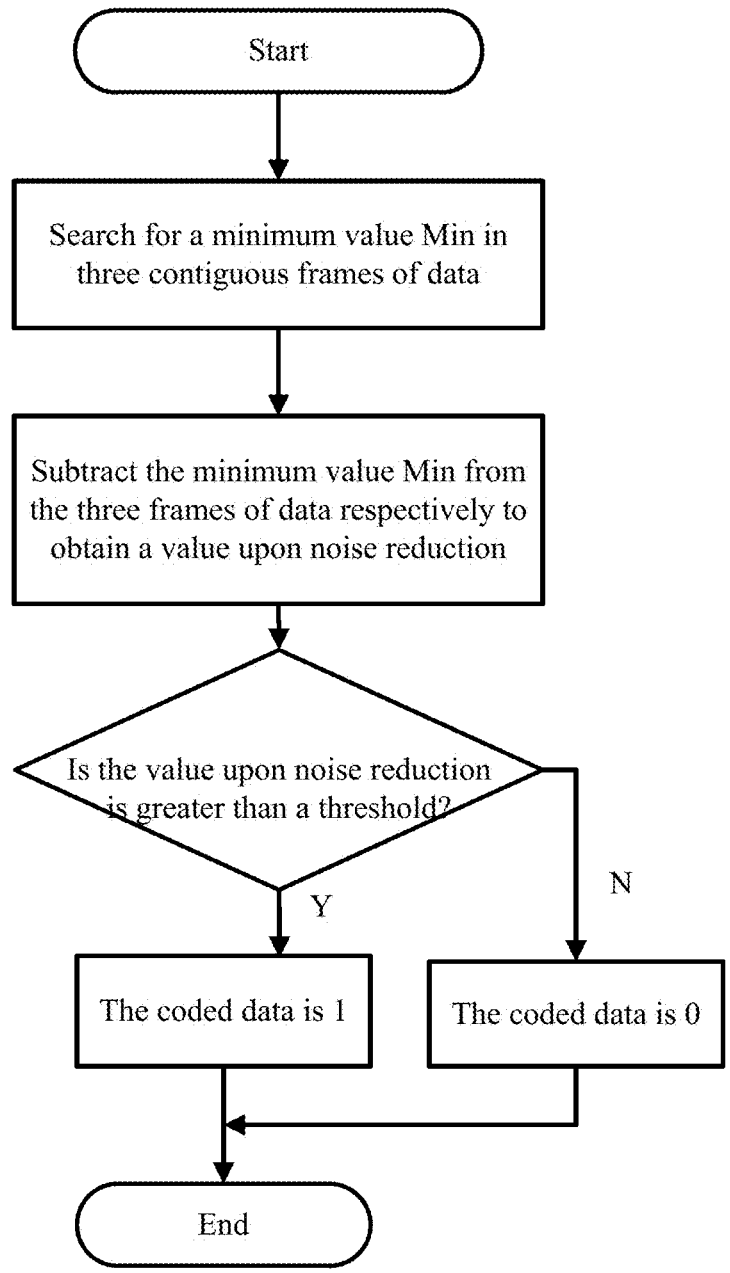
FIG. 4 is a detailed flowchart illustrating a method for communication between a touch control device and an external device according to an embodiment of the present invention.

With reference to FIG. 4, the touch controller at the touch screen end short-circuits all the one-dimensional induction electrodes thereof and detects the electrodes, one frame is scanned per 100 μs, and totally three frames are scanned within a 300-μs time unit at the corresponding pen end. The detected signal is superposed with the LCD interference. At least one frame of data of each three frames of data has no valid signal, that is, has only the LCD interference, and the amplitude of the signal is less than a valid frame. Therefore, most of the interference may be filtered as long as a frame of data having a minimum value is searched from the three contiguous frames of data and the minimum value is respectively subtracted from the other two frames of data. Afterwards, it is judged according to the noise-reduced data and a threshold that the coded value is 0 or 1.

Embodiment 2

Two mobile devices send data by means of short-range contact with the touch screen. One device acts as a sending end, and generates a signal by using a driving electrode; and the other device acts as a receiving end, and receives the signal sent by the sending end by using the driving electrode. As such, communication is achieved between the two devices. During the communication, due to the impact caused by the LCD interference, the detected data may be subjected to an error. Therefore, the receiving end needs to reduce noise for the detected signal. By transferring and replying a specific sequence, the receiving end and the sending end acknowledge presence of each other. As such, in the subsequent communication, data may be transmitted by disabling the LCD and the like interference source, thereby improving the transmission efficiency.

In practice, the LCD interference is homogeneous with a short time period. when the LCD interference is subjected to any change, the frequencies may also become higher or lower.

With reference to FIG. 5 to FIG. 8, data coding is performed by using different frequencies to represent different data. Frequency F1 represents 1, and frequency F2 represents 0. The sending end sends the signal according to the coding, and each bit of data is transmitted by using 200 μs. With the first 160 μs, the driving electrode may send the signals at the corresponding frequency, and within the remaining 40 μs, no signal is sent. Therefore, with respect to a coding sequence of 1010, signals having frequencies F1, F2, F1 and F2 are sequentially sent, which consumes 800 μs. For accurate identification of the sequence, upon sending of each coding sequence, null signals are present within a time period. During this time period, the sending end detects whether the receiving end returns a sequence of 1010 for a response. Assume this detection time period is 1000 μs, it is equivalent that 1000 μs null signals are inserted (with respect to the receiving end, no signal is sent at this time).

Figure 5:
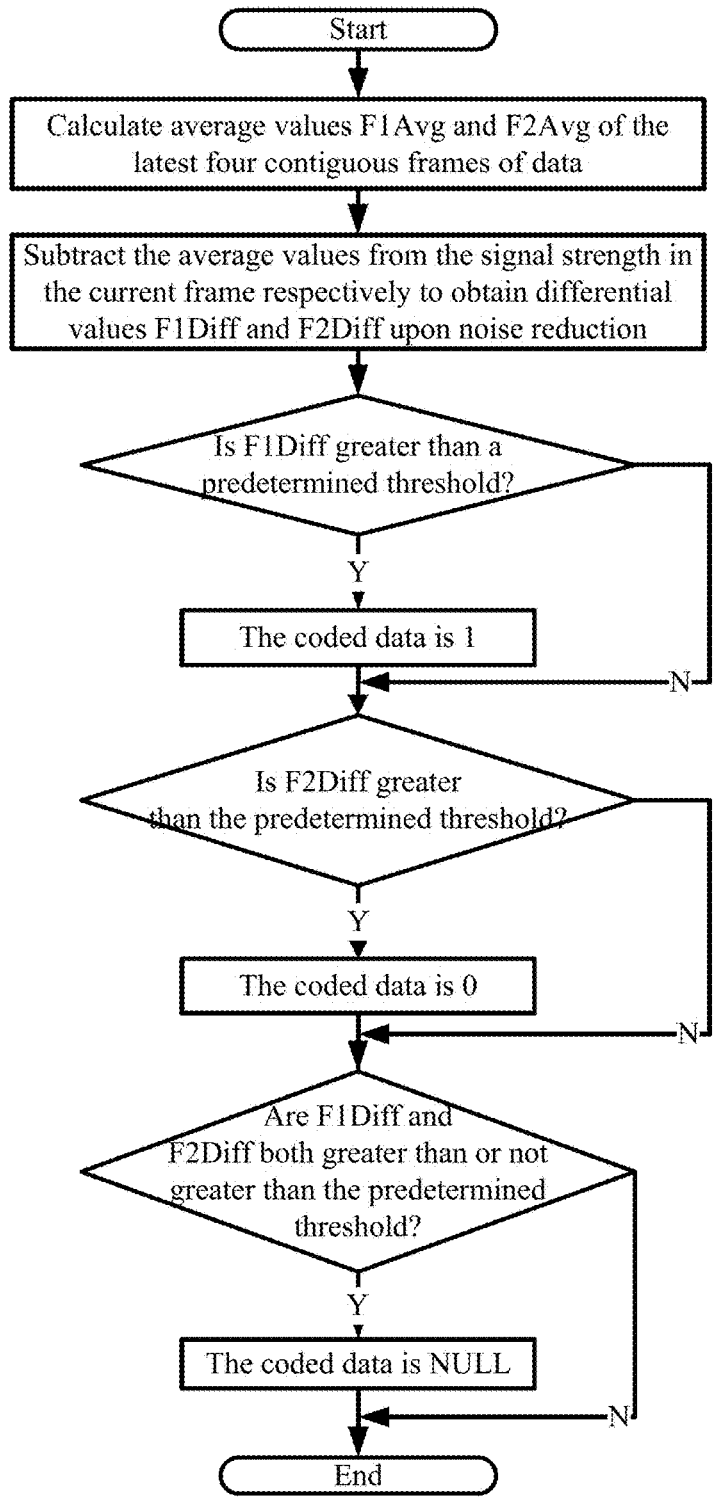
FIG. 5 is a detailed flowchart illustrating a method for communication between a touch control device and an external device according to another embodiment of the present invention.
Figure 6:
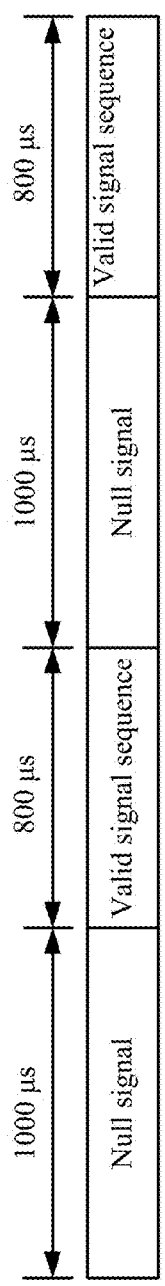
FIG. 6 is a diagram illustrating a time sequence of a valid signal and a null signal at a sending end in the method for communication between a touch control device and an external device according to an embodiment of the present invention.
Figure 7:
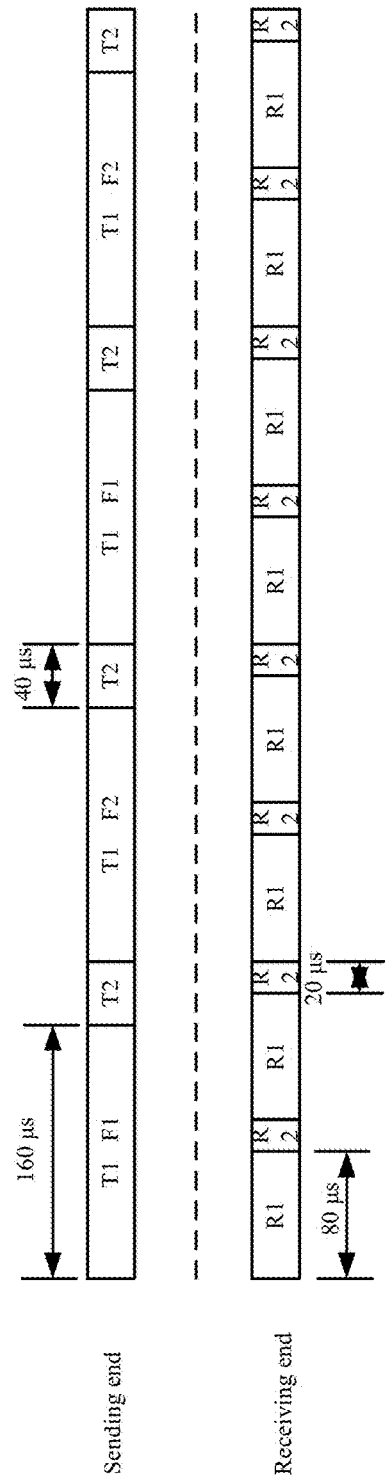
FIG. 7 is a schematic diagram illustrating a time sequence of communication between a sending end and a receiving end in the method for communication between a touch control device and an external device according to an embodiment of the present invention.
Figure 8:
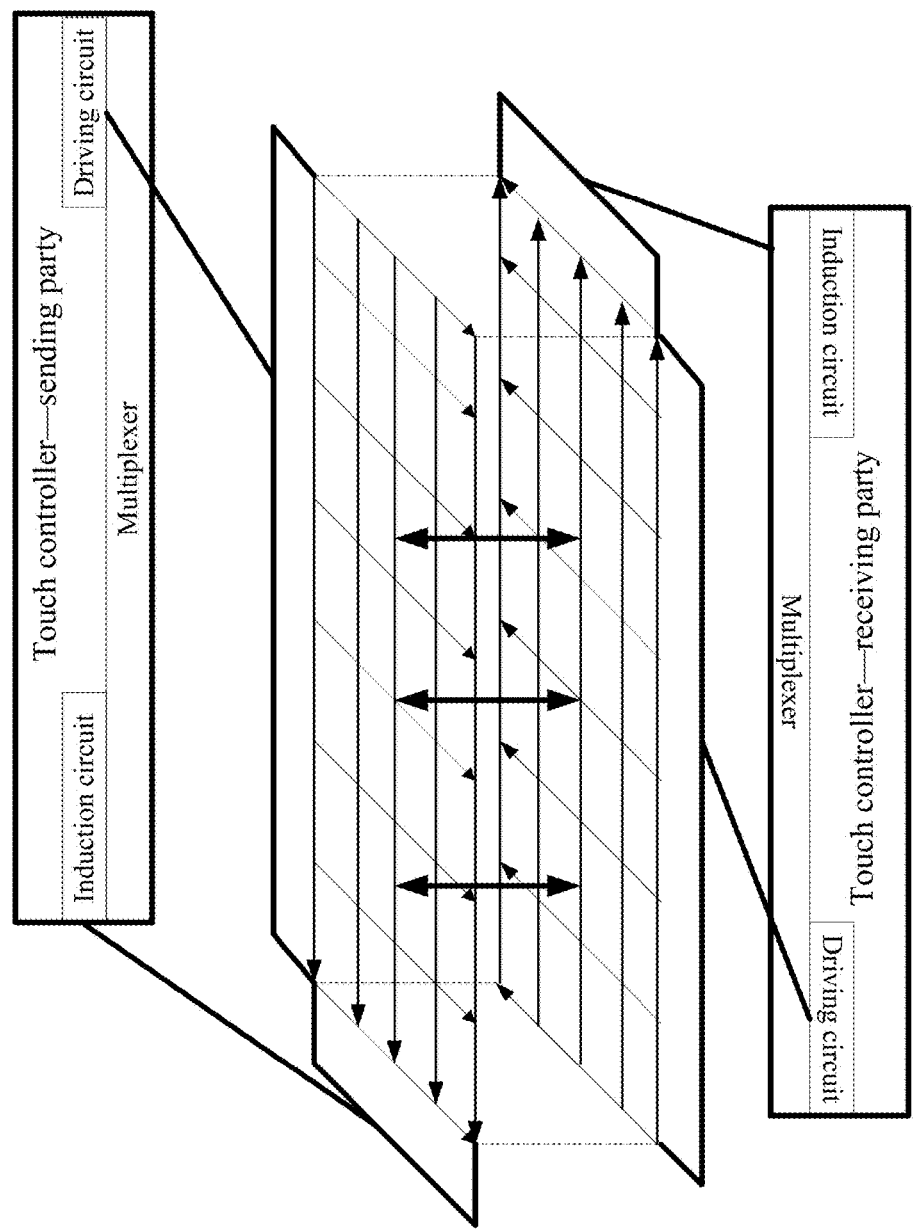
FIG. 8 is a schematic diagram illustrating a time sequence of communication between one mobile terminal and another mobile terminal according to an embodiment of the present invention.

With reference to FIG. 5, by sending the sequence of 1010, the receiving end may perform noise reduction according to the following method to improve the reliability.

1. The touch controller detects all the one-dimensional induction electrodes thereof, and one frame is scanned per 100 μs, wherein signal detection is performed within the first 80 μs and is not performed within the remaining 20 μs. Each time signal strengths at frequencies F1 and F2 may be parsed, and the latest four signal strengths at frequencies F1 and F2 may be stored.

2. Within a 400-μs time unit, the receiving end totally scans four frames, and average values F1Avg and F2Avg are obtained by averaging the four signal strengths at frequencies F1 and F2. Differential values F1Diff and F2Diff are obtained by subtracting their average values F1Avg and F2Avg from the latest frames (current strengths) F1 and F2. If F1Diff is greater than a threshold, it is judged that data 1 is received, and if F2Diff is greater than the threshold, it is judged that data 0 is received. When both F1Diff and F2Diff are greater than or not greater than the threshold, it is judged that null signal N is received. Through such operation, the LCD interference may be eliminated relatively accurately, and valid signals may be separated from the noise.

3. The sending process of the sending end involves alternate sending of 1000 us null signals and 800 us valid signals. Therefore, before a valid signal is detected, the three previous detected signals are all null signals, that is, only the LCD interference is present previously, and the current frame is a superposition of the LCD interference and the F1 valid signal. Through the processing in the above judgment method, it may be determined that data 1 is received. Then each time a frame of data is sampled, such processing is performed. Under the best circumstance, the sequence 11 00 11 00 may be obtained. Since the sent sequence is twice the received sequence, the received sequence is 1010.

4. In practice, since the time sequence windows may be subjected to nonalignment, during two detections of 11, the null signal may be present in one detection; and likewise, during two detections of 00, the null signal may be present in one detection. However, valid signals are present in at least one of the detections. Therefore, the sequence 1010 may be still judged in the case of (1N N0 1N 00) and (1N 0N N1 N0).

5. In practice, the validity of a sequence may also be judged according to the length of an effective sequence. That is, through seven or eight detections, a valid sequence may be preliminarily judged.

With the method for communication between a touch control device and an external device according to embodiments of the present invention, by changing a coding manner of communication between other devices and the touch screen and reducing noise for the signal received by the touch screen, the interference caused by the LCD to the signal may be reduced, the probability of communication errors of the touch screen may be lowered, and the quality of the communication between the touch screen and the external device is improved.

Figure 9:
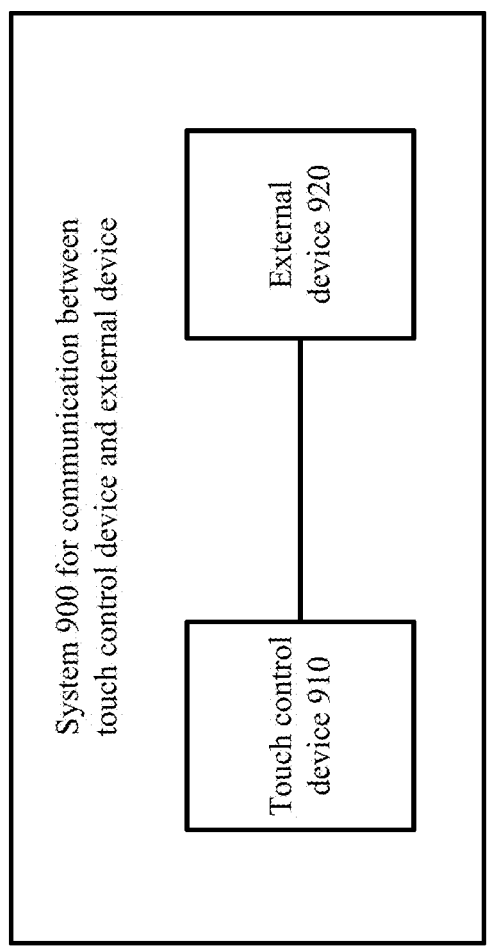
FIG. 9 is a schematic diagram illustrating a system for communication between a touch control device and an external device according to an embodiment of the present invention.

FIG. 9 is a schematic diagram illustrating a system for communication between a touch control device and an external device according to an embodiment of the present invention. As illustrated in FIG. 9, a system 900 for communication between a touch control device and an external device according to an embodiment of the present invention comprises: a touch control device 910 and an external device 920.

Specifically, when the external device 920 establishes communication with a touch screen of the touch control device 910, the external device 920 is configured to send 1-bit data to the touch screen within each sending period, wherein the 1-bit data sent within each sending period is a combination of a valid signal and an invalid signal, or an invalid signal. The touch control device 910 is configured to scan the bit data based on a predetermined scanning period to obtain N frames of scanned data, wherein the predetermined scanning period is 1/N of the sending period; obtain a strength of an LCD interference signal according to one frame of data having a minimum signal strength among the N frames of scanned data; and reduce noise for the N frames of scanned data according to the strength of the LCD interference signal. If the 1-bit data sent within each sending period comprises a valid signal, a predetermined valid signal sending time is equal to the scanning period.

Specifically, the touch control device 920 is configured to: acquire at least one frame of scanned data which is an invalid signal from the N frames of scanned data; and use a value of a data frame of the at least one frame of scanned data as the strength of the LCD interference signal.

In the above examples, the touch control device 910 is, but not limited to, a mobile terminal, and the external device 920 is, but not limited to, a touch pen or a mobile terminal.

Further, after reducing noise for the N frames of scanned data according to the strength of the LCD interference signal, the touch control device 910 is further configured to: subtract the one frame of scanned data having the minimum signal strength from the remaining frames of scanned data in the N frames of scanned data; compare the difference with a predetermined value; and obtain a bit data value corresponding to the bit data according to the comparison result, wherein if the difference is greater than the predetermined value, judge that a value of the corresponding 1-bit data is 1, and otherwise, judge that the value of the corresponding 1-bit data is 0. The predetermined value is empirically determined.

With the system for communication between a touch control device and an external device according to embodiments of the present invention, by changing a coding manner of communication between other devices and the touch screen and reducing noise for the signal received by the touch screen, the interference caused by the LCD to the signal may be reduced, the probability of communication errors of the touch screen may be lowered, and the quality of the communication between the touch screen and the external device is improved.

In the description of the present specification, reference terms such as "an embodiment", "some embodiments", "examples", "specific examples", "some examples", or the like are intended to refer to that the specific features, structures, materials, or characteristics which are described in combination with the embodiments or examples are comprised in at least one embodiment or example of the present invention. In this specification, schematic expressions of the above terms do not necessarily indicate the same embodiments or examples. In addition, the described specific features, structures, materials, or characteristics may be combined in any one or multiple embodiments or examples in a suitable way.

Although the embodiments of the present invention are described in detail above, persons or ordinary skill in the art may understand that without departing from the principle and intention of the present invention, various variations, modifications and replacements may be made to these embodiments, and the scope of the present invention is defined by the appended claims and their equivalents.

INDUSTRIAL PRACTICABILITY

With the system for communication between a touch control device and an external device according to embodiments of the present invention, by changing a coding manner of communication between other devices and the touch screen and reducing noise for the signal received by the touch screen, the interference caused by the LCD to the signal may be reduced, the probability of communication errors of the touch screen may be lowered, and the quality of the communication between the touch screen and the external device is improved.

What is claimed is:

1. A method communication between a touch control device and an external device, comprising the following steps:
when the external device communicates with a touch screen of the touch control device, sending, by the external device, 1-bit data to the touch screen within each sending period, wherein the 1-bit data sent within each sending period is a combination of a valid signal and an invalid signal, or an invalid signal;
scanning, by the touch screen, the 1-bit data based on a predetermined scanning period to obtain N frames of scanned data, wherein the predetermined scanning period is 1/N of the sending period;
determining, by the touch control device, a frame of scanned data having a minimum signal strength among the N frames of scanned data;
determining, by the touch control device, the minimum signal strength is a strength of an LCD interference signal; and
reducing noise for the N frames of scanned data according to the strength of the LCD interference signal comprising:
subtracting, by the touch control device, the strength of the LCD interference signal from a signal strength of each of remaining frames, except for the frame of scanned data having the minimum signal strength, of the N frames of scanned data respectively.

2. The method according to claim 1, wherein after the reducing the noise for the N frames of scanned data according to the strength of the LCD interference signal, the method further comprises:
subtracting the frame of scanned data having the minimum signal strength from the remaining frames of scanned data in the N frames of scanned data to obtain a difference;
comparing the difference with a predetermined value; and
obtaining a value corresponding to the 1-bit data according to a comparison result, wherein if the difference is greater than the predetermined value, judging that the value corresponding the 1-bit data is 1, and otherwise, judging that the value corresponding the 1-bit data is 0.

3. The method according to claim 1, wherein if the 1-bit data sent within each sending period comprises the valid signal, a predetermined sending time of the valid signal is equal to the scanning period.

4. The method according to claim 1, wherein the frame of scanned data having a minimum signal strength is one frame of scanned data corresponding to the invalid signal.

5. The method according to claim 1, wherein the touch control device is a mobile terminal, and the external device is a touch pen or a mobile terminal.

6. A system for communication between a touch control device and an external device, comprising the touch control device and the external device; wherein
when the external device establishes communication with a touch screen of the touch control device, the external device is configured to send 1-bit data to the touch screen within each sending period, wherein the 1-bit data sent within each sending period is a combination of a valid signal and an invalid signal, or an invalid signal; and
the touch control device is configured to scan the 1-bit data based on a predetermined scanning period to obtain N frames of scanned data, wherein the predetermined scanning period is 1/N of the sending period; determine a frame of scanned data having a minimum signal strength among the N frames of scanned data; determine the minimum signal strength is a strength of an LCD interference signal; and reduce noise for the N frames of scanned data according to the strength of the LCD interference signal comprising subtracting the strength of the LCD interference signal from a signal strength of each of remaining frames, except for the frame of scanned data having the minimum signal strength, of the N frames of scanned data respectively.

7. The system according to claim 6, wherein after reducing the noise for the N frames of scanned data according to the strength of the LCD interference signal, the touch control device is further configured to: subtract the frame of scanned data having the minimum signal strength from the remaining frames of scanned data in the N frames of scanned data to obtain a difference; compare the difference with a predetermined value; and obtain a value corresponding to the 1-bit data according to the comparison result, wherein if the difference is greater than the predetermined value, judge that the value corresponding the 1-bit data is 1, and otherwise, judge that the value corresponding the 1-bit data is 0.

8. The system according to claim 6, wherein if the 1-bit data sent within each sending period comprises the valid signal, a predetermined sending time of the valid signal is equal to the scanning period.

9. The system according to claim 6, wherein the frame of scanned data having a minimum signal strength is one frame of scanned data corresponding to the invalid signal.

10. The system according to claim 6, wherein the touch control device is a mobile terminal, and the external device is a touch pen or a mobile terminal.

* * * * *